United States Patent [19]
Perry

[11] 3,780,223
[45] Dec. 18, 1973

[54] ANTIBIOTIC SENSITIVITY MEASUREMENT SYSTEM

[75] Inventor: Russell C. Perry, Smithtown, N.Y.

[73] Assignee: Artek Systems Corp., Farmingdale, N.Y.

[22] Filed: Aug. 21, 1972

[21] Appl. No.: 282,351

[52] U.S. Cl....... 178/6.8, 178/DIG. 6, 178/DIG. 36, 235/92 PC
[51] Int. Cl. .... G06f 3/05, G06m 11/04, H04n 7/18
[58] Field of Search......................... 178/6.8, DIG. 6, 178/DIG. 21, DIG. 36; 235/92 PC

[56] References Cited
UNITED STATES PATENTS

| | | | |
|---|---|---|---|
| 3,671,667 | 6/1972 | Thorpe | 178/DIG. 6 |
| 3,679,820 | 7/1972 | Montone | 178/DIG. 36 |
| 3,681,528 | 8/1972 | Henderson | 178/DIG. 21 |
| 3,720,812 | 3/1973 | Downs | 235/92 PC |

Primary Examiner—Howard W. Britton
Attorney—Leonard H. King

[57] ABSTRACT

An antibiotic sensitivity measurement system which measures and displays the size of zones of inhibition which develop around discs of antibiotics on a microbiological diffusion assay. The system first accurately locates the actual centers of each disc by generating a search window and finding each disc from a digitized picture within the window. The system then generates a plurality of concentric circles at predetermined increments about each center until a required number of coincident points are detected between the circles and the digitized perimeter of the zones.

20 Claims, 12 Drawing Figures

PATENTED DEC 18 1973 3,780,223

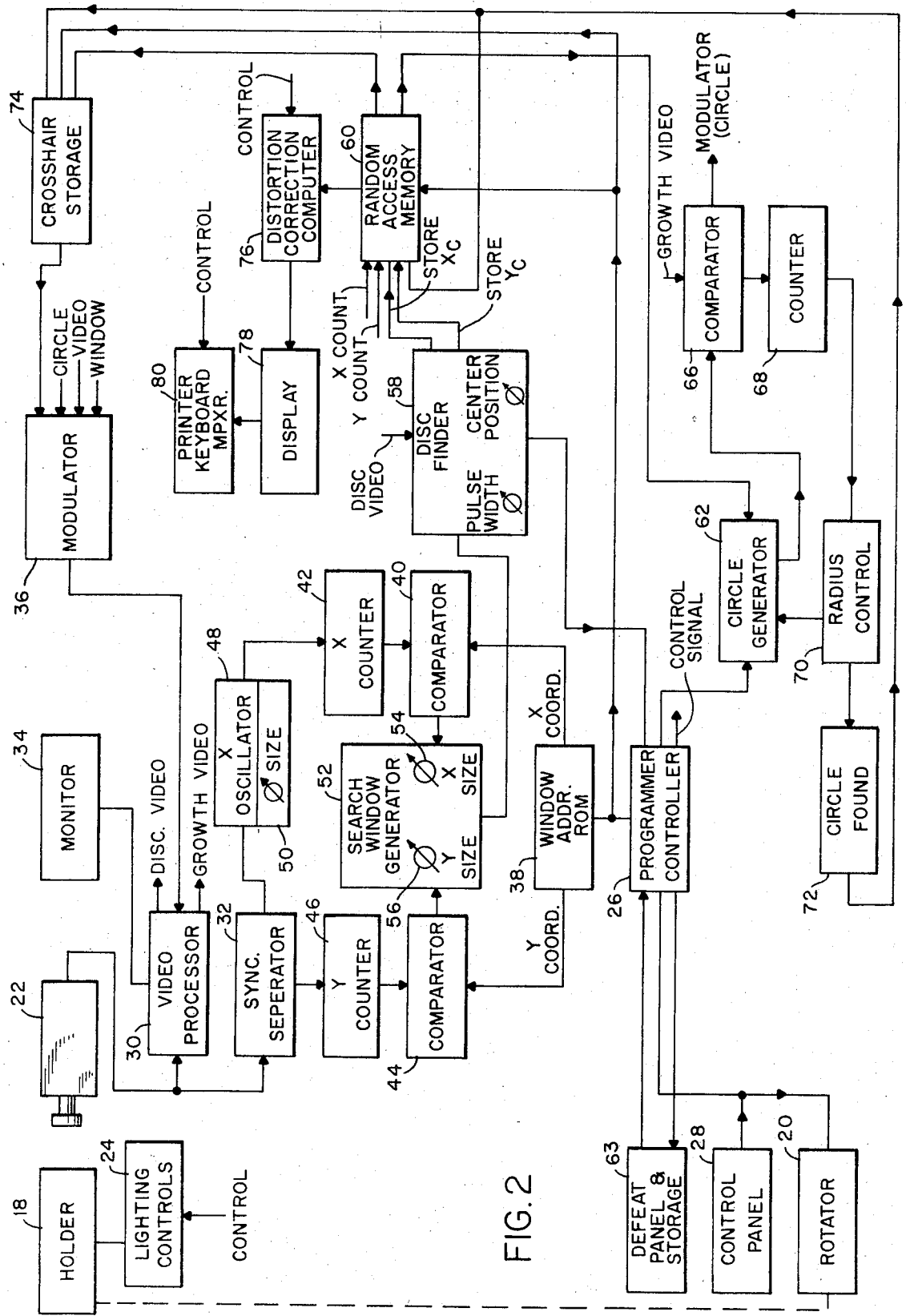

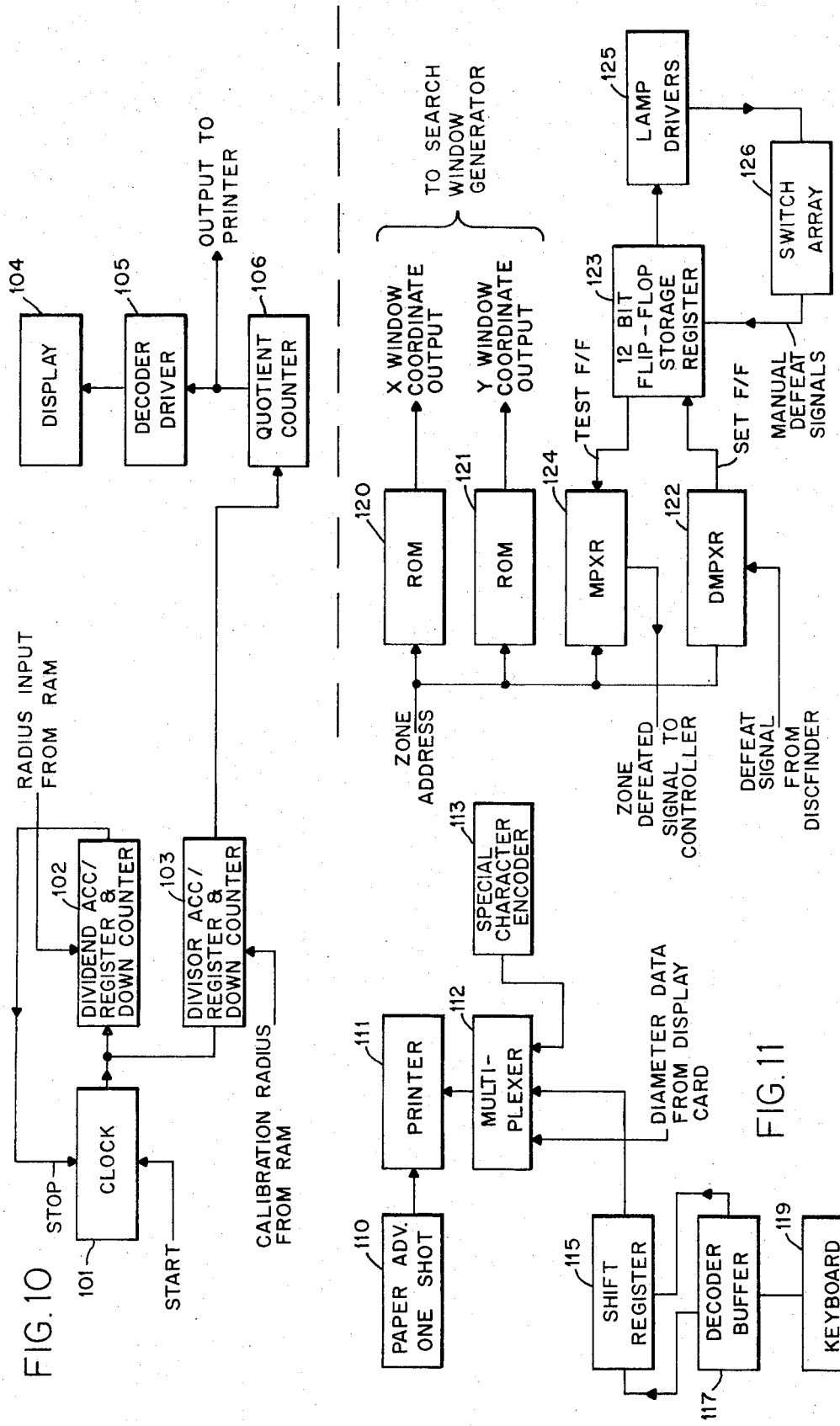

ANTIBIOTIC SENSITIVITY MEASUREMENT SYSTEM

This invention relates to an antibiotic sensitivity measurement system and, more particularly, to a method and apparatus for measuring zones of inhibition in a microbiological diffusion assay.

BACKGROUND OF THE INVENTION

The use of automatic methods of analysis has made significant contributions to microbiology. Numerous methods and systems have been proposed for removing the manual control and excessive time consumption involved in microbiological techniques. Many of these automatic systems have increased not only the speed but the precision of the testing procedures. One of the standard diagnostic tools used by hospitals, laboratories and pharmaceutical houses involves the microbiological diffusion assay wherein an agar medium is initially inoculated with a microorganism and then an antibiotic is allowed to diffuse from a reservoir onto the agar medium. After incubation, zones of inhibition are seen around the reservoir. The diameters of the zones are a function of the antibiotic effectiveness and concentration. Usually, the antibiotic is applied by means of discs of absorbent material which are placed symmetrically around the agar medium. Each of the discs generally contains a different antibiotic or a different concentration of the same antibiotic. By comparing the diameters of the zones of inhibition grown around the discs, the potency and effectiveness of the antibiotic against the assay organism can be measured.

In the past, the zones of inhibition in a medium were measured manually which required an excessive amount of time and the skill of a laboratory technician. While many automatic pattern recognition and measurement systems were available, the standard types were not well suited for the particular application of diffusion assay measurement since in this type of measurement the automatic system must be capable of selecting a particular zone and measure that zone independently of all other zones. Also, it is required that some of the zones be skipped if, for example, the antibiotic did not take effect and no zone had developed about the disc. Furthermore, although the discs are usually placed at known positions about the medium, frequently the actual placement of the discs is slightly shifted from the theoretical position because of mechanical drifting problems. Furthermore, the pattern of the zone surrounding the discs does not always form a completely closed perimeter. While the zones of inhibition generally do approximate a circular shape, there are many gaps in the perimeter where the edge is blurred and not well defined. Accordingly, prior devices could not be easily used for automatic measurement in antibiotic sensitivity systems.

It is therefore an object of the present invention to provide an automatic antibiotic sensitivity measurement system which is capable of scanning and measuring zones of inhibition in a culture medium.

A further object of the invention is to provide a measurement system for zones of inhibition which are spaced near or at predetermined positions around a culture medium.

A further object of the invention is to provide an antibiotic sensitivity measurement system which first finds the actual center of the discs containing the antibiotic and then measures the zone surrounding each disc as determined from the actual centers.

Still a further object of the invention is to provide an antibiotic sensitivity measurement system which locates the actual center of the disc by generating a search window within the scan area and finding each particular disc within the search window as the window moves about the area.

A further object of the invention is to provide an antibiotic sensitivity measurement system which measures the size of the zone of inhibition by generating a plurality of concentric circles about the zone centers which expand at predetermined increments of radius until they intersect the growth area, and then the circles are contracted at predetermined decrements until a fixed number of coincident points of intersection occur between the circles and the growth area.

Yet a further object of the invention is to provide an antibiotic sensitivity measurement system which can detect the presence or absence of a particular zone of inhibition and automatically defeat the zone address when it is found non-existing.

Another object of the invention is to provide an antibiotic sensitivity measurement system which displays the digitized picture of the growth areas and superimposes by means of cross hairs a generated circle approximating the area of the zone of inhibition.

Still a further object of the invention is to provide an antibiotic sensitivity measurement system which corrects distortion resulting from non-linearities in the video system.

These and further objects and features of the invention will be more apparent from the following description taken in conjunction with the accompanying drawings.

BRIEF DESCRIPTION OF THE INVENTION

Briefly, this invention describes an antibiotic sensitivity measurement system which can scan and measure the zones of inhibition which grow around antibiotic discs placed on a culture medium. A culture dish containing the spaced discs and zones is placed on a holder which can be rotated to locate a particular part of the culture dish within the field of view of a television scanning camera. The dish can be bottom lit to cause the discs to appear black against a white background or can be top lit whereby the zones appear contrasted to the remaining culture area. The television camera first scans the culture medium to provide a digitized picture of the actual locations of the discs. A plurality of search windows are generated. Each window is located to encompass one disc at its presumed location. The presence of each disc is determined within its search window and the actual center of the disc is found.

A circle generator fan generates a circle about the actual center location of each disc. The circle is expanded at fixed increments until the perimeter of the circle generated intersects the growth area which is also scanned by the television camera. When a fixed number of intersection points occur, the circle is decrementally contracted, where the decrement value is less than the increment value, until a suitable circle is found which approximates the zone area. A set of cross hairs are generated approximating the circle found which is superimposed upon the digitized video picture of the growth area. The dimension of the circle generated is displayed and can be printed out for each particular zone measured. When a particular disc is not found within a search window, that zone is defeated and the subsequent circle generation does not take place around that particular zone center.

Essentially, the method of operation of the system follows four steps: Firstly, a search window is generated; secondly, the actual disc centers are found within the search window; thirdly, a plurality of concentric circles are generated around the actual centers; fourthly, the coincident points between the circles generated and the digitized growth area are counted until an appropriate circle is found.

BRIEF DESCRIPTION OF THE DRAWING

In the various figures, like reference characters designate like parts.

In the Drawings:

FIG. 2 shows a block diagram of the entire system of the present invention;

FIG. 10 shows a block diagram of the distortion correction computer and display unit;

FIG. 11 shows a block diagram of the printer, keyboard and multiplex unit; and

FIG. 12 shows a block diagram of the controller unit.

DETAIL DESCRIPTION OF THE INVENTION

Figure 1:
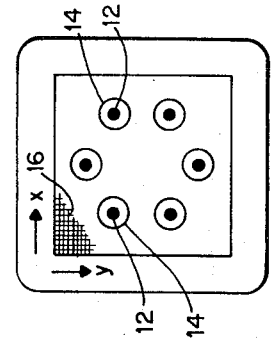
FIG. 1 shows a video picture of a scanner culture dish.

Referring to FIG. 1, there is shown an example of the field to which the present invention applies. A culture dish generally contains a plurality of discs symmetrically spaced near the periphery of the dish. Zones of inhibition develops around these discs after an incubation period. When the disc is viewed by scanning camera, a digitized picture appears of the culture dish. The video picture is shown in FIG. 1 wherein the discs are shown at 12 each surrounded by a zone shown at 14. Although only six discs are shown in FIG. 1, it is understood that the culture medium could have more or less discs, all of which can be accommodated by the present system. In order to identify particular points in the culture dish area, a grid system is developed electronically that breaks up the field of view into a grid pattern. For the present application, a grid pattern of 200 by 200 lines are used. A portion of the grid is shown in the upper left hand corner 16, wherein the vertical direction is called the Y direction and the horizontal direction, the X direction.

Referring now to FIG. 2, there is shown a system block diagram of the present invention. The dish to be measured is placed in a holder 18 which is controlled by a rotator 20 to position particular areas of the dish within view of a scanning television camera, 22. Lighting controls 24 under control signal from a program controller 26 can bottom light the dish whereby the discs appear black against a bright background, or can stop light the dish whereby the zones appear white against the black background of the agar medium. A particular zone can be addressed by means of a control panel 28 which selects the particular zone to be measured and causes the rotator 20 to locate that zone in the field of view of the camera 22.

The output from the camera 22 feeds a video processor 30 and a synchronizing separator 32. The output from the video processor is displayed on a monitor 34 for view by an operator of the system. The video processor also receives signals from a modulator 36.

Figure 3:
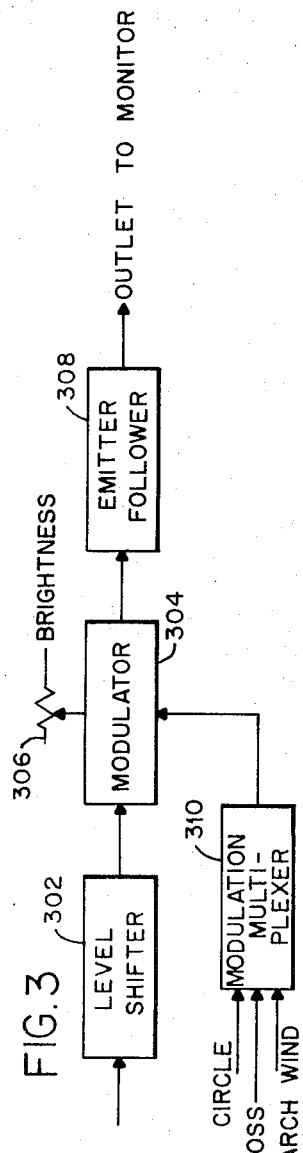
FIG. 3 shows a block diagram of part of the video processor.

Referring now to FIG. 3 there is shown further details of the video processor 30 and modulator 36. As shown, the video output from the camera passes through level shifter 302 and then through a modulator 304 whose brightness can be controlled by a brightness control 306. The signal then passes through an emitter follower 308 which drives the monitor (shown in FIG. 2) through an appropriate impedance cable. The modulator 304 produces white modulation on the camera picture from any one of a number of sources which enter the modulator. The inputs to the modulator accede from the video signal from the television camera, pass through a multiplexer 310. The signals entering the multiplexer unit from other areas to be hereinafter described include the circle from the circle generator, the cross hairs from the cross hair storage and the search window from the search window generator. During the disc search operation to be hereinafter described, the operator will see the disc within the search windows on the monitor. During the growth measurement operation to be hereinafter described, the operator will see on the monitor the growth area with the circle generated and the cross hair generated.

Figure 4:
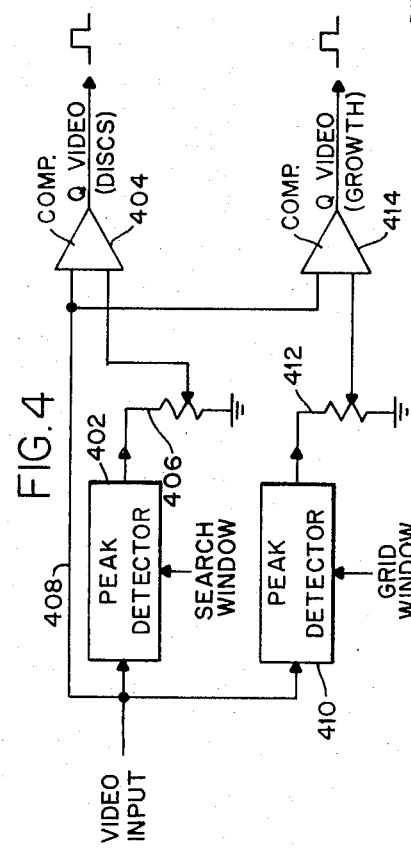
FIG. 4 shows a block diagram of another part of the video processor.

The video output from the camera 22 (FIG. 1) which passes through the video processor produces a digitized picture for further use by the rest of the system. Referring to FIG. 4, there is shown additional parts of the video processor which produce the disc video and growth video digitized pictures. When the dish is bottom lit, as heretofore explained, the digitized picture is that of the discs. When the dish is top lit, the digitized video is that of the zones and growth area. The video input passes through peak detector 402 which serves as a threshold detector whose threshold is adjustable by a front panel control. The peak detector 402 is gated on and off by the search window. A portion of the output from peak detector 402 is selected by selector 406 and is sent as one input to a comparator 404 whose other input is the video signal itself along line 408. The output from the comparator 404 is a quantized video signal of the discs.

When the video input represents the zone-growth area, the signal passes through peak detector 410 whose control is gated on and off by the main or grid window rather than the search window. The output then passes through selector 412 where part of the signal is sent to comparator 414. The other input to the comparator is the video signal itself from line 408. The output from comparator 414 is a quantized video signal of a growth area. As shown, the polarities of the signals for both the disc and growth are both the same. That is, the output pulse is positive for the presence of a disc and positive for the presence of a growth area.

Figure 5:
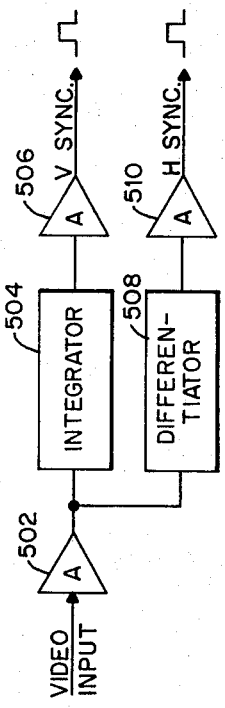
FIG. 5 shows a block diagram of the synchronizing separator.

The output from the television camera 22 (FIG. 1) also passes through the synchronizing separator which is shown in more detail in FIG. 5. The video signal passes through an amplifier 502 and then through an integrator 504 whose output is amplified at 506 and thereby produces a vertical synchronizing pulse. The output from amplifier 502 is also sent through a differentiator 508 whose output is amplified at 510 thereby producing a horizontal synchronizing pulse.

The system, before measuring the zones of inhibition, must first find the actual locations of the discs. Although their locations are presumably known, the actual placement of the disc often varies from the presumed location because of mechanical inaccuracies or drifting of the disc from its placed position. Sometimes, no disc at all will be placed in a specific position. Thus, prior to actually determining the size of the zone, the actual center of the disc, and correspondingly the actual center of the zone, must first be determined.

The grid coordinate system is first divided up into a number of windows corresponding to the number of discs in the particular system. For the disc system shown in FIG. 1, six search windows would be used. However, other numbers of search windows could be used depending upon the number of zones to be expected. The X and Y coordinate position of the upper left hand corner of each of the six windows is stored in a read only memory 38. When a particular zone is to be measured, the operator selects the zone on the control panel 28 which, through the controller 26, sends a zone address signal to the read only memory 38 whereby the memory 38 puts out a pair of coordinate positions corresponding to the upper left hand corner of the search window corresponding to that particular zone selected. The X coordinate position is sent to one side of a digital comparator 40. The other side of the comparator 40 is connected to an X counter 42. Similarly, the Y coordinate from the memory 38 feeds one side of a comparator 44, and Y counter 46 feeds the other side of comparator 44. The Y counter 46 counts the raster lines produced by the camera 22 and is synchronized therewith by the synchronize separator 32. The count begins at a point near the top of the screen determined by a fixed amount of delay which can be provided by a grid-shot triggered by the first vertical synchronizing pulse. In this manner, the grid area can be spaced from the outer perimeter of the video displayed, thereby centering the digitized pattern within the entire display area on the monitor screen.

The X counter 42 counts oscillator pulses from an X oscillator 48. The X oscillator 48 is turned on by a fixed delay from the horizontal synchronizing pulse from the synchronizing separator 32. The X oscillator runs for 200 counts and stops, thereby dividing each horizontal line into 200 segments. The vertical component of the grid system, the Y counter, 46, counts 200 raster lines and then stops. The spacing of the X grid lines can be determined by the size control 50 on the X oscillator increasing or decreasing the size of the pulses thereby arranging the X size to fill the entire pattern available on the display units.

The outputs from comparators 40, 44 are signals which represent the fact that the television camera has reached the particular spot corresponding to the upper left hand corner of the search window. These signals are fed to a search window generator 52 and trigger the generator to produce the search window.

The search window generator contains a first one-shot 54 which receives the X signal and produces a pulse which determines the horizontal width of the resulting search window. The search window generator also consists of a second one-shot 56 which receives the Y signal and produces a pulse which provides the vertical dimension of the resulting search window. The outputs from the two one-shots are synchronized in a synchronizer contained within the search window generator which produces an output which is a composite window having a dimension determined by the settings of the two on-shot controls. It is understood that the size of the search window can be controlled by setting the size of the pulse produced by each of the one-shots.

If the original coordinates of the upper left hand corners of the window were properly stored and the discs were in their exact locations, the center of the search window would fall on the center of the disc. However, in order to provide latitude in the placement of the discs on the culture dish, the search window size in this application is made approximately three times the diameter of the disc in both the vertical and horizontal directions. As long as the disc falls entirely within the boundaries of the window, its center will be accurately found by the machine.

Figure 6:
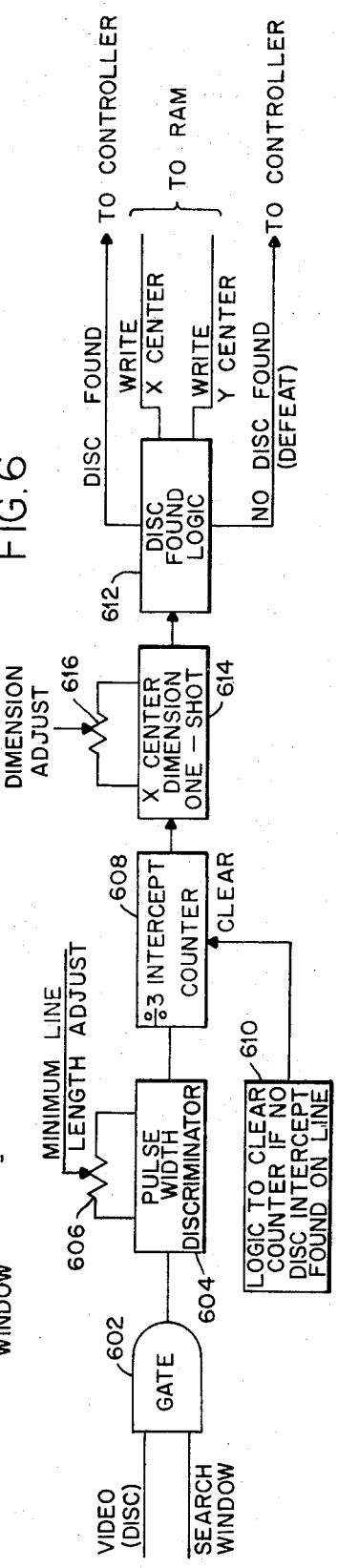
FIG. 6 shows a block diagram of the disc finder.

Once the search window has been generated, the window is sent to a disc finder 58 which also receives the disc video signal from the video processor 30. It should be noted that the window produced by the search window generator 52, is also sent through the modulator 36 and video processor 30 whereby it is displayed on the monitor 34. Details of the disc finder 58 are shown in FIG. 6, wherein the information from the search window as well as the disc video signal from the video processor is fed into a gate 602 such that the output from the gate represents the video disc information contained only within the search window. The output from the gate 602 is fed to a pulse width discriminator 604 whose length of pulse is controlled by an adjustment 606. The purpose of this discriminator is to be sure that the object under consideration is a disc and not some circuit noise or small object other than a disc. An example of such an object might be a small colony growing within the zonal area. In order to be considered as a valid disc, this embodiment has arbitrarily fixed it that an object must have at least four consecutive lines longer than the setting of the pulse width discriminator. This eliminates small objects from consideration. The pulse width discriminator is, therefore, set at just slightly below the known diameter of the disc. As the video scanning signal having pulses representing the presence of the disc, is measured, the fourth consecutive line longer than the pulse width discriminator is approximately the diameter of the circle.

To implement this, a divide by 3 intercept counter 608 is fed by the pulse width discriminator 604. At the end of each line, a flip-flop contained within the counter 608 is interrogated to find out whether a valid disc intercept has been found on that line. If a valid intercept longer than the pulse width disc setting has been found, the counter is allowed to accumulate that count. If no valid disc intercept has been found on that line, the counter is allowed to clear. The logic to test and clear the counter is shown generally at 610. The disc finder will continue to look for a valid disc throughout the search window until the bottom of the window is reached. If, at that time, a disc has not been found, a signal is sent from the disc find logic 612 to the controller (shown in FIG. 2 at 26) indicating that the zone is to be defeated. If, on the other hand, an object is found having three consecutive lines of the proper length, the disc finder will then measure from the edge of the disc to a dimension determined by the X coordinate of the disc center at that point. The X center dimension is accomplished by means of a one-shot 614 whose X dimension can be adjusted by means of 616. The disc found logic 612 will then send a disc found signal to the controller and also will store the coordinates of the disc in the random access memory 60 (shown in FIG. 2).

The coordinate positions of the disc center are shown in the drawing by the symbol $X_c$ and $Y_c$ representing X and Y center. When the X and Y center coordinates have been recorded in the memory 60, the controller 26, will then index to the next zone address, produce a window, look for a disc and continue the operation until the dish has been completely covered and all the zone positions have been searched for and determined.

Once this process has been completed, the information concerning the actual centers of the discs are located in the random access memory 60 and the absence of a particular disc is stored in the defeat panel 63. The number of discs to be read can be varied by altering the original coordinate location in the read only memory 38 and thereby altering the location of the search windows. Also, the window size can be varied to accommodate smaller or larger search windows by varying the size of the one-shots 54, 56. Since the search windows themselves appear on the screen during the disc finding process, the operator can set the video processor threshold control for the disc video at this time.

When the disc finding operation is completed, the apparatus then proceeds to measure the size of the zones by means of a plurality of circles which are generated. The circles are generated by circle generator 62 which receives the disc center locations from the random access memory 60 as well as an initial radius for the circle to be generated. The operator can select a particular zone to be measured by means of the control panel 28 which then communicates with the controller 26 to send a particular zone addressed to the random access memory 60. The coordinates of the disc corresponding to that zone are then sent to the circle generator 62 which then generates a circle around that particular center coordinate at the initial radius dictated by the memory 60. The initial diameter of the circle is set to be slightly larger than the diameter of the disc.

A circle can be easily generated using a normal oscillascope display, by generating two sine waves, one of which is shifted in phase with respect to the other and applying these to the deflection plates simultaneously. Also, in the normal oscillascope since the tracing spot can be caused to move in all directions, the location of the particular circle generated can be placed at will. However, in the raster scan system being used in the present apparatus, the tracing spot moved from top to bottom and from left to right in a linear fashion. The circle, therefore, cannot be generated by the superposition of sine waves. In addition, both the horizontal and vertical sweep rates in a television monitor or camera are fixed. The circle generator must, therefore, provide a series of properly timed pulses such that when superimposed on the raster scan, produce the outline of the circle. The center of the circle must also be capable of movement to any location within the grid. Furthermore, the diameter of the circle must be capable of expansion and contraction on command.

Figure 7:
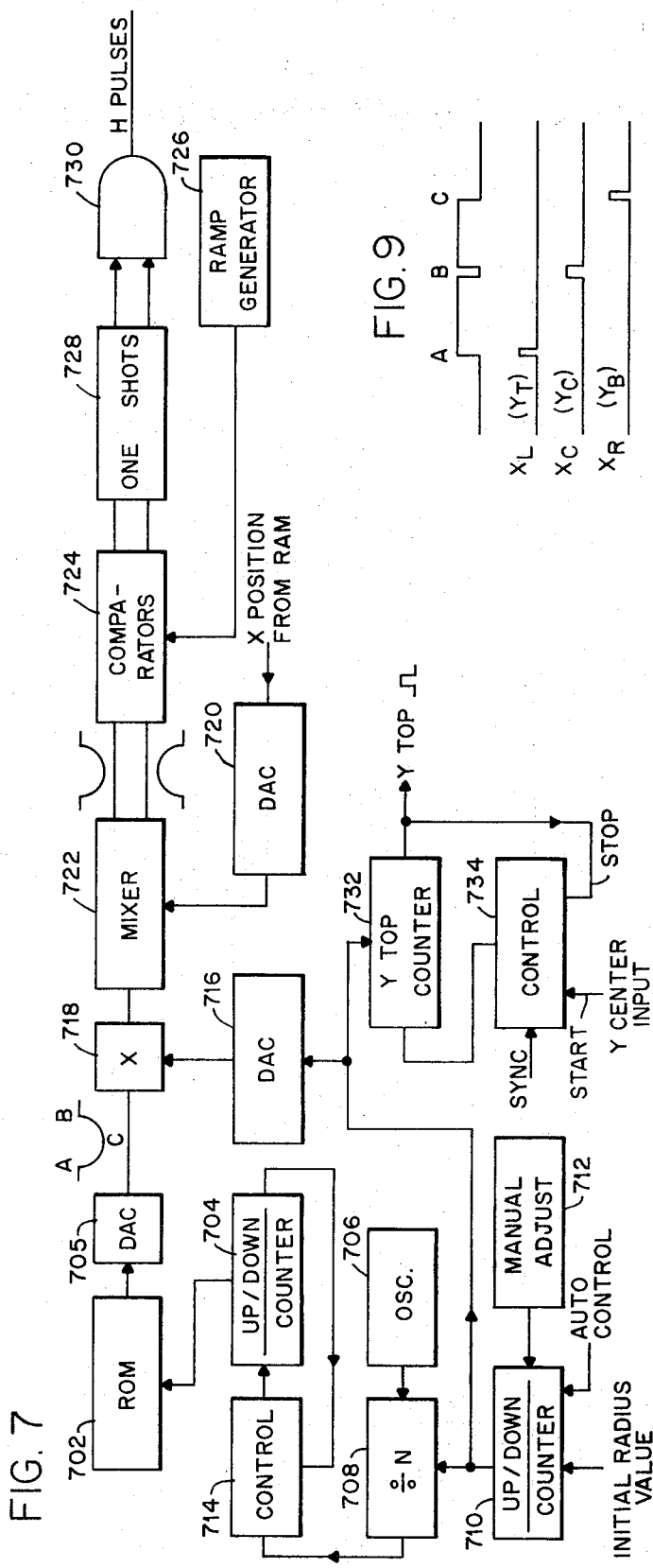
FIG. 7 shows a block diagram of the circle generator.

Referring now to FIG. 7, there is shown details of the circle generator. The circle generator contains a read only memory 702 which stores a functional equasion representing a circle. The particular equation used in this embodiment is: $x = \sqrt{65,025 - (255 - 4k)^2}$. As is evident, as $k$ increases from 0 through 63, the value of X increases and as $k$ decreases from 63 down to 0, the value of X decreases. However, the values of X represent a circle as a function of $k$ representing a rectilinear path. The read only memory is, therefore, set as a 64 word storage device which is addressed by means of an up-down counter 704 set to count from location 0 through location 63 and then reverse direction counting from 63 back to 0. As each location in the read only memory 702 is addressed, the read only memory 702 produces an output X corresponding to the above identified equation. The output from the read only memory 702 is sent to a digital to analog converter 705 which produces an analog function of the digital numbers. There results a semicircular signal extending from points A to B as shown in the diagram. It is to be noted, that as the frequency with which the Up-Down counter counts is increased, the read only memory will produce the values at a faster rate and, accordingly, the points A and B on the analog wave form will change and move closer together.

In a raster scan system, the vertical dimension of the circle is a function of the frequency, that is, the rate at which the points on the circumference of the circle are presented in the scanning lines. The horizontal dimension of the circle, however, is a function of time. The circle generating system must, therefore, provide for a horizontal dimension as a function of time and a vertical dimension as a function of frequency. Also, in order to keep the circle round as its diameter is varied, the frequency and time relationship must be maintained at a fixed ratio. The combination of the counter 704, the read only memory 702 and the digital to analog converter 705, all provide the conversion from frequency to time. As the frequency of the counter 704 changes, so too will the time delay between points A and B change.

The frequency at which the UP-DOWN counter 704 operates is determined by a clock oscillator 706 whose frequency is divided down by a divide by n circuit 708. The divisor n is determined from a further UP-DOWN counter 710 which holds the radius value of the circle to be generated. The radius value can be incremented or decremented at the control input by either automatic control or the manual adjust control 712. The initial radius value from which the circle expands is loaded into the UP-DOWN counter from the initial radius value in the random access memory. As the value of the radius changes, the number in the UP DOWN counter 710 changes which cause the divisor N in the circuit 708 to correspondingly change. This alters the frequency of counting which is fed into the UP DOWN counter 704 through the control 714. Thus, the frequency at which the counter 704 counts, is proportional to the radius. The analog wave form at the output of digital to analog converter 704 will therefore also have its distance between A and B proportional to the radius.

In addition to changing the distance between A and B, it is also necessary to correspondingly change the distance from the line AB to the point C so that the circle will retain its round shape. Furthermore, the distance between the line AB and the point C must change in proportion to the distance between points A and B. This is accomplished by taking the output from the UP DOWN counter 710 and passing it through a digital to analog converter 716 to produce a constant value proportional to the radius. This is then multiplied in multiplier 718 with the wave form from the digital to analog converter 705. The output from multiplier 718, is then an analog wave form which represents a well shaped semicircle whose radius is directed from the automatic or manual control to UP-DOWN counter 710.

It is necessary to locate the circle at the particular center coordinates which are associated with the zone to be measured. The X position from the random access memory 60 is sent to a digital to analog converter 720 which converts it into an analog value which is then mixed in mixer 722 with the semicircular wave form from the multiplier 718. The output appears on two lines as is shown; the left to center half of the circle appearing on one line and the right to center of the circle appearing on the other line. The center of the circle, however, is now located at the proper X position along the horizontal scan line. The two outputs from the mixer 722 are fed to the comparator 724 where they are compared with the voltage from a ramp generator 726. The comparator has output lines which provide a signal to a one-shot 728 which produces a pulse whenever the ramp generator value and the output from the mixer 722 coincide in voltage. The upper line in the diagram would contain the intersections between the left to center part of the circle and the ramp generator, and the lower line would contain the intersections between the center to right part of the circle and the ramp generator. The outputs are then or'd together through or gate 730 and leave as the pulses for the horizontal scan line appropriate to form the circle at the radius desired.

It is required to determine the proper vertical position for each of the horizontal scan pulses produced at the output of the gate 730. The first line in the circle must occur at the appropriate place on the screen in order to make the circle concentric with the disc. However, the only information available from the random access memory 60 (FIG. 2) is the Y position of the circle center and not the topmost edge of the circle. The vertical grid as has been mentioned before, is exactly 200 lines from the top to the bottom of the screen. If a counter, having as its count input, the synchronizing pulses is preset to a value equal to the radius of the desired circle and is then allowed to begin counting when the Y count of the synchronizing pulses is equal to the value of the Y center as is stored, the counter will reach the number 200 at a point exactly equal to the top most edge of the desired circle. This function is carried out by the counter 732 called the Y top counter and control element 734 which feeds the Y counter. The initial radius value, or the particular radius value determined by automatic or manual control from UP DOWN counter 710, is also sent to the Y counter 732 as an initial counting value. From that point, when the count of the synchronizing pulse exactly equals the Y center input, the control 734 begins the counter 732 to count. When the counter reaches the value 200, it automatically stops and produces a pulse indicated as the Y top pulse. This value is combined with the horizontal pulses such that the horizontal pulses begin at the horizontal scan line at which the Y top provides a pulse and sequentially thereafter continues producing the horizontal pulses for each scan line until the circle is concluded.

The theory determining the size of the zones of inhibition will now be explained. The outer perimeter of the zone-growth boundary approximates a circle; however, it is an irregular shaped circle with discontinuities. A circle concentric with the disc center and, therefore, approximately concentric with the growth zone perimeter, is generated and is then incrementally expanded until it intersects with the zone perimeter by a specified number of coincident points. That circle will approximately represent the zone perimeter and the diameter of the circle generated will be a very close approximation of the diameter of the growth zone. For further accuracy, and to speed up the operation, the initial radius of the circle generated is made to be slightly larger than the disc diameter. The circle is then incremented in large steps until it slightly passes the zone perimeter and is whthin the growth area itself. The circle is then decremented at a smaller rate until a predetermined number of coincident points are detected. The final circle is the one approximating the zone perimeter.

Referring back to FIG. 2 the output from the circle generator 62 feeds a comparator 66 whose other input is the growth video from the video processor 30. The comparator compares the two signals to determine the coincident points between the circle generated and the perimeter of the zone as scanned. The output feeds a counter 68 which counts the number of coincident points for the particular circle generated. Should the counter not find the predetermined number of points, it signals radius control unit 70 which automatically increments the value of the radius fed into the circle generator 62. The circle generator 62 will then generate a larger circle in accordance with the new radius and, again, the comparator and counter will determine if the circle has passed into the growth area. When the counter 68 has determined that the circle has passed into the growth area outside of the zone, the radius control 70 then begins decrementing the circle. The radius control 70 is set so that the increment value during the first series of measurements is greater than the decrement value during the second series of measurements. For example, the incrementing can be in sixteen unit radius increments until a fixed count has been found in the counter 68 at which time the decrementing is at single unit decrements until, again, a fixed number of intercept points have been counted by the counter 68. At this time, the radius control 70 signals the circle found unit 72 which transmits the radius of the final circle into the random access memory 60 and into the cross hair storage 74. The output from the comparator 66 is also fed directly to the modulator 36 which, through the video processor 30, displays on the monitor 34 the varied circles generated and the final circle determined.

Figure 8:
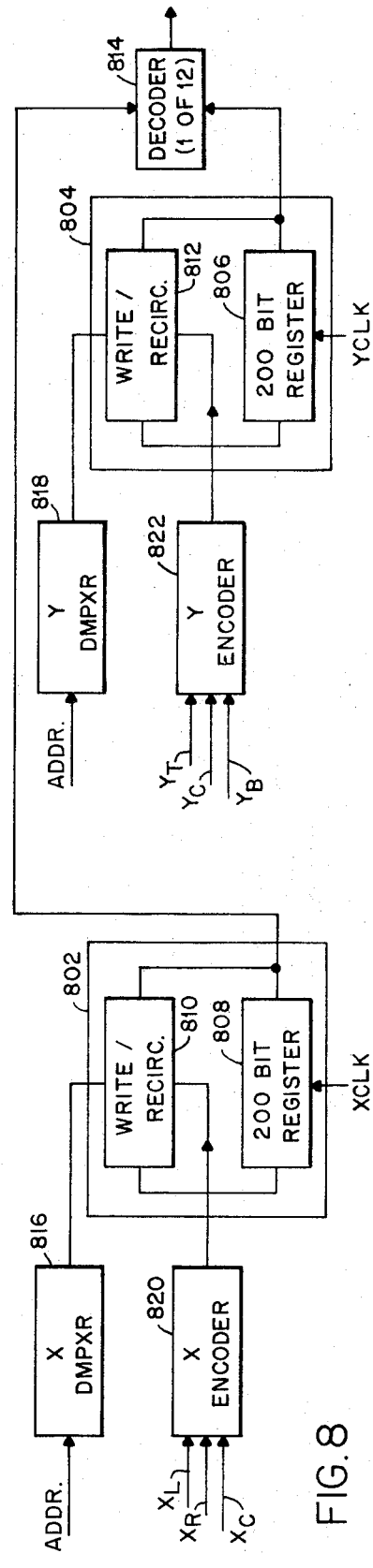
FIG. 8 shows a block diagram of the cross hair storage unit.

The cross hair storage 74 is used to display to the operator the cross diameters of the final circle generated which determines the zone area. Referring to FIG. 8, there is shown a detail block diagram of the cross hair storage. The cross hair storage comprises two memory blocks shown at 802 and 804, each of which contain twelve identical registers and write/recirculate controllers. One of each of the registers are shown in the memory blocks, identified as 806 and 808, respectively; and one write/recirculate controller is shown in each block, shown at 810 and 812, respectively. The outputs from the memory blocks 802, 804, feed a set of 12 decoders, one of which is shown at 814. All of the twelve decoders are wired together into an OR circuit, the output of which feeds the modulator 36 (FIG. 2) with cross hair information. Memory unit 802 is used for the X line and memory unit 804 is used for the Y line. Each of the X and Y registers, 808 and 806, respectively, contain two hundred bits of storage corresponding to the 200 grid lines in the present embodiment. In the X memory, 802, the registers are multiplexed to achieve high speed operation and comprise two 100 bit registers operating in multiplex fashion to obtain the required 200 bits of storage. The Y memory, 804, contains 200 bit registers similarly multiplexed as described for the X register.

The memories are each fed by a demultiplexer wherein the multiplexer 816 serves the X memory and demultiplexer 818 serves the Y memory. The demultiplexers receive the zone address from the controller 26 as a zone is selected by the operator. The output from each demultiplexer is used to control the addressed write/recirculate loop of the particular memory under consideration. As a particular zone is selected, the cross hair storage produces a set of cross hairs identifying the particular zone selected. Accordingly, the memories in the cross hair storage would, of necessity, have to retain a very great amount of bit storate capacity. In order to reduce the required bit storage capacity, the encoding system shown in FIG. 8 is used. The encoding scheme comprises an X encoder, 820, and a Y encoder, 822. Each encoder respectively receives the center of the generated circle as well as the extreme and points on a diameter. The X encoder 820 therefore receives the value of the X center as well as the left most point, $X_l$ and the right most point, $X_r$. Similarly, the Y encoder 822 receives the y center as well as the Y top and Y bottom values from the circle generator 62 (shown in FIG. 2).

Figure 9:
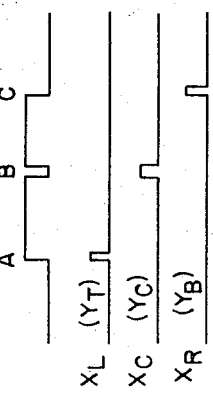
FIG. 9 shows a series of pulse diagrams helpful in the explanation of FIG. 8.

Referring to FIG. 9, the encoding scheme is shown with the values of X and the corresponding values of Y shown in parenthesis. The second line represents $X_L$ which shows a pulse at the left hand side of a line which passes through the center of the circle horizontally. The bottom line represents $X_r$ which is a pulse at the right end of that line and the line $X_c$ represents the center of the circle as read from the disc finding process. The resulting wave form is shown at the top of the picture which is derived from the signals in the encoder 820 and presented to the input of the memory 802. The wave form is what recirculates in the memory. The composite wave form is seen to have a rising edge shown at A coincident with the left hand side of the horizontal cross hair line; its falling edge at C coincident with the right hand edge of the horizontal cross hair line and the center notch at B coincident with the position of the vertical part of the cross hair line as derived from the center information stored in the random access memory 60. It is understood that the same wave form is present in the Y memory 804 and the pulses that produce it are shown in parenthesis in the diagram. Thus, by means of the circuit shown in FIG. 8, a set of cross hairs can be produced at the particular zone addressed by the operator and a reduced amount of memory is required for the production of the cross hairs.

To provide for suitable accuracy in the display and measurement of the zones, a distortion correction computer 76 (FIG. 2) is included in series with the dispaly 78. The purpose of this correction computer is to remove differences in circle diameter that would result as a consequence of non-linear distortion as a given circle is moved from point to point on the screen area. This distortion results from lens aberrations and non-linearities in the television camera deflection signals and vidicon tube.

It is exceedingly difficult to produce an absolutely linear television picture over the entire screen area. Such a camera, although probably available would be prohibitively expensive for the present application. However, the linearity in a small region of the screen area is fairly constant with time. If a circle with a radius of, for example, 128 units were centered on each of the zone positions and its actual radius recorded as read from the measuring grid, a table of values could be made for each radius. This radius serves as the calibration radius and is used in the distortion correction computer 76 as shown in FIG. 2.

Prior to the operation of the present apparatus for measuring an assay medium, the system is initially calibrated. In the calibration mode, a plate is placed in the field of view of the camera having a given number of zones each measuring exactly 128 units. The circle generating process is carried out and the resulting radii are stored in the memory locations reserved for the calibration radii. If the television system were perfectly linear throughout the entire screen, each of the zones would have the number 128 stored in it. However, more than likely, each of these numbers will be different depending upon the location of the zone in the field of view. The calibration equation used is as follows:

Corrected radius = measured radius × 128/calibrated radius

By using this equation, a true corrected radius can be obtained from any given measured radius by multiplying the measured radius by 128 units and then dividing by the calibration radius, stored in the memory for that particular zone. After the calibration process has been completed, any given dish to be measured will produce a set of radii that are stored in the random access memory 60 and later operated upon by the distortion correction computer shown to produce corrected radii which do not suffer from non-linearities of the television scanning system.

Details of the distortion correction computer 76 and display 78 are shown with reference to FIG. 10. The radius determined by the circle generator is sent to the random access memory 60 which provides the radius input to a dividend accummulator-register and down counter shown at 102. When the radius value is loaded into the accumulator 102, it is shifted to the right by six bit positions, thereby multiplying it by 128. The calibration radius which had been previously determined during the calibration mode of operation is loaded from the random access memory 60 (FIG. 2) into a divisor accummulator-register and down counter shown at 103. Clock generator 101 serves to count down the dividend register 102 to 0. When the dividend register reaches 0, the clock is stopped. The divisor register 103 counts down from the calibration radius to 0 a number of times dependent upon the number of times which the divisor can be subtracted from the dividend register. Each time the divisor register reaches 0, the quotient counter 106, which receives its output from register 103, is incremented by a count of 1. When the dividend register is empty, the quotient counter 106 will contain a number equal to the measured radius times 128, divided by the calibration radius. This is the corrected radius which, when multiplied by 2, gives the diameter output. One output from the quotient counter 106 which represents the diameter, is sent to the output printer. This information also passes through decoder-drivers 105 to be displayed by display 104.

The output from the entire system, in addition to being displayed, can also be permanently recorded on an output printer shown at 80 (FIG. 2). The output will be a record indicating the zone address and the corresponding diameter for that zone address. Input information relating to the particular dish or the particular zone, can be provided by using an input keyboard. Details of the printer are shown in FIG. 11. The diameter data from the display unit 78 enters the system and passes into the multiplexer shown at 112. Under control of a special character encoder shown at 113, the multiplexer will put out either the diameter recorded, as specific units of measurement such as millimeters, or special characters indicating that a zone has been defeated, or that it has exceeded its maximum size.

Another input to the multiplexer 112 is an information number derived from the keyboard 119. The keyboard feeds a decoder buffer shown at 117 which removes contact bounce and also decodes the keyboard into proper digits such as binary coded decimal numbers which are then loaded in parallel into shift register 115. The output digits are then fed into the multiplexer 112. A paper advance signal from a paper advance one-shot shown at 110 controls the feeding of the paper into the printer 111 for proper advancement.

The defeat panel and storage unit 63 together with the read only memory 38, which were shown in FIG. 2, is shown in further detail in FIG. 12. The zone addresses are initially stored into the read only memory 120 and 121 which produce respectively the X window coordinate output and Y window coordinate output as heretofore explained. When the disc finder 58 fails to locate the presence of a disc within a window, it sends a defeat signal into demultiplexer 122 which sets a corresponding flip-flop within the flip-flop storage register 123 which corresponds to the particular zone being addressed. The storage register 123 then sends a signal through multiplex 124 to the controller 26 (shown in FIG. 2). The storage register 123 also controls a set of lamp drivers 125 such that a particular lamp is assigned to the particular zone which is being measured. Furthermore, a plurality of switches 126 contains a particular switch for each of the zones. In this manner, the operator can, by means of the switch array 126, manually defeat a particular zone which he feels should not be measured or is not pertinent to the particular measurement being made.

The program controller 26 implements the control signals for the proper functioning of the various units heretofore described and coordinates all the operations.

In operation, the machine begins by viewing a test plate and generating a series of circles for each of the zones on the test plate thereby finding the calibration radius which is stored in the distortion correction computer 76. The machine is then ready for measurement of a particular micro-organism assay. The assay dish is loaded into the holder and the rotater begins to move the dish. The bottom light comes on, at which time the disc video is digitized and displayed on the monitor 34. The zone address begins at the first zone and, based upon the coordinates stored in the read only memory 38, a search window, visible to the operator, is generated for the first zone. The disc finder 58 searches for the disc and either sets the disc flip-flop indicating that a disc had been found, or defeats the zone. This information is stored in the defeat panel and storage 63 which sends suitable signals to the program controller 26. If a disc has been found, its coordinates are stored in the random access memory 60. The zone address is then incremented and the operation continues until all of the zones have been found.

The circle generator 62 is then fed with the initial radius and the center data of the first zone. The circle generator 62 generates a plurality of circles until an appropriate circle for the particular zone has been found. The radius of the end circle is stored in the random access memory 60 at the particular zone addressed. The zone address is then incremented and the operation continues until all of the zones have been measured and the radius of each zone has been stored in the random access memory.

At this time the cross hairs are displayed to the operator. The operator has the option to accept all the zone diameters as displayed; defeat any zone by pushing the appropriate button on the control panel which sets the appropriate flip-flop of the defeat panel, or alter any diameter by operating the manual adjust lever on the circle generator.

Following these operations, the system is then placed into its printout cycle whereby the information is printed out and displayed.

While this invention has been described with regard to particular circuits and block diagrams, it will be understood that the system could be produced with variations and modifications as are known in the art without departing from the scope of the invention and its method as has been described.

What I claim as new and desire to secure by Letters Patent is:

1. A system for measuring individually the zones of inhibition surrounding a plurality of antibiotic reservoirs located in a spaced arrangement on an innoculated medium comprising:

a. scanning means for viewing the medium and electronically producing a first digitized picture of the reservoirs within the medium, and a second digitized picture of the zones within the medium;

b. search window generating means for producing a fixed geometric shape whose size is larger than each of said reservoirs and for superimposing said geometric shape in sequential poistions on to said first digitized picture, such that for each position a different one of said reservoirs is located within said shape;

c. reservoir center finding means receiving the superimposed picture from said scanning means and said search window generating means and finding within each of said sequential positions of the geometric shape, the actual center location of the reservoirs;

d. circle generating means for sequentially generating a plurality of concentric circles of predetermined incremental radii about each of said actual center locations found by said reservoir center finding means;

e. comparison means receiving the second digitized picture from said scanning means and said circles from said circle generating means and comparing the points of intersection between each of said circles and the perimeter of the digitized zone for each of the zones and selecting for each zone the particular circle producing a predetermined number of points of intersection; and f. output means for displaying the selected circle and its dimensions.

2. A system as in claim 1 wherein said comparison means further comprises:

a. a comparator receiving the second digitized picture from said scanning means and said circles from said circle generating means and comparing the points of intersection between each of said circles and the perimeter of the digitized zones and producing an output signal for each intersection point;

b. counter means receiving said output signal and producing a signal at a predetermined count; and c. radius control means receiving said last mentioned signal from said counter means and having an output connected to said circle generating means, said radius control means producing for each zone being measured a first incremental radius value and a second decremental radius value of smaller magnitude than said first radius value.

3. A system as in claim 1 wherein said output means further comprises cross hair producing means for displaying a set of orthogonal cross hairs at the actual center locations representing the selected circle and being superimposed upon the second digitized picture.

4. A system as in claim 1 wherein said output means further comprises means to calibrate said system to compensate for distortions in said scanning means.

5. A system as in claim 1 and further comprising a control panel for selecting the particular zone to be measured.

6. A system as in claim 1 wherein said scanning means includes a raster scan video means and wherein said circle generator means further comprises:

a. calculating means for producing a series of values approximating a circle as a function of rectilinear index positions:

b. frequency control means connected to said calculating means for controlling the rate of occurrence of said rectilinear index positions;

c. multiplication means connected to the output of said calculating means for multiplying said values by a predetermined amount; and d. radius control means connected to said frequency control means and said multiplication means for coordinating said rate of occurrence and said predetermined amount of multiplication to obtain a circular shape.

7. A system as in claim 6 wherein said calculating means includes:

a. memory means storing the values corresponding to each index position; and b. a first digital-to-analog converter connected to the output thereof;

Wherein said frequency control means further includes:

c. a first up/down counter producing said index positions and connected to said memory means; and d. an oscillator whose frequency is controllable and whose output is connected to said first counter; and Wherein said radius control means further includes:

e. a second up/down counter whose adjustable count represents the radius of the desired circular shape; and f. a second digital-to-analog converter connected to said multiplication means, the output from said second up/down counter being connected to said second digital-to-analog converter and to said oscillator.

8. A system as in claim 6 wherein said circle generating means further comprises shifting means for locating the arcular shape about one of the actual center locations found by said reservoir center finding means.

9. A system as in claim 8 wherein said shifting means further comprises:

a. counting means connected to the output of said raster scan video means and capable of counting up to the total number of horizontal scan lines in the digitized picture and producing an output signal thereat; and b. control means for presetting said counter means with a number corresponding to the vertical center coordinate of the actual center location and triggering said counter means to begin counting when said raster scan video means begins scanning the horizontal line passing through said center coordinate.

10. A system as in claim 8 wherein said shifting means further comprises:

a. mixing means for combining the actual center location with the circular shape;

b. ramp generating means for providing a continual output value as a function of time for each horizontal scan line; and c. comparison means for comparing the value at the output of said mixing means with the output from said ramp generating means and producing a pulse at the equality thereof.

11. A system as in claim 1 wherein said scanning means further comprises:

a. raster scan video means focused on to the medium;

b. synchronizing means connected to said raster scan video means and producing pulses identifying the horizontal and vertical position of the location being scanned; and c. video processor means receiving the output of said raster scan video means and digitizing the picture scanned.

12. A system as in claim 1 wherein said video processor means includes peak detector means whose threshold can be controlled.

13. A system as in claim 11 wherein said search window generating means further comprises:

a. memory means containing the coordinate locations of each of the sequential positions;

b. coordinate comparators for comparing the pulses produced by said synchronizing means with the coordinate locations stored in said memory means and producing an output signal at each equality; and c. horizontal and vertical pulse producing means receiving said output signal and in response thereto producing a rectangular video shape.

14. A system as in claim 11 wherein said scanning means further comprises:
   a. holding means for retaining the medium to be viewed; and
   b. lighting means connected to said holding means and having first and second states, said first state identifying the reservoirs against the medium background and said second state identifying the zones against the medium background.

15. A system as in claim 14 wherein said scanning means further comprises rotation means connected to said holding means for sequentially rotating said medium into indexed positions for selectively and individually viewing said zones.

16. A system as in claim 11 wherein said reservoir center finding means further comprises:
   a. gate means receiving the geometric shape from the search window generating means for each sequential position, and receiving the first digitized picture from said scanning means, and for each of said positions passing only that portion of the scan lines of the first digitized picture which are within the search window to that position;
   b. pulse width discriminator means receiving the scan line output from said gate means and passing only that portion of each scan line whose length is greater than a predetermined length;
   c. counting means receiving the output of said pulse width discriminator means for counting the number of consecutive scan lines passing through said discriminator and producing an output signal when a predetermined number if reached; and
   d. computing means receiving said output signal and on the horizontal scan line which produced the output signal, calculating the actual coordinate center using a fixed value of the reservoir radius.

17. A system as in claim 16 wherein said reservoir center finding means further includes:
   a. defeat means connected to said counting means and responsive to the lack of any output signal therefrom for an entire position; and
   b. storage means connected to said computing means and said defeat means for storing with the actual coordinate center for each reservoir found and the absence of any reservoir not found.

18. In a raster scan video system, means for generating a circle comprising: first means for generating a series of values as a function of frequency; second means connected to said first means for converting said frequency values into a series of time dependent values; third means connected to said second means for multiplying said time dependent values by a fixed amount; and fourth means connected to said first and third means for coordinating the frequency value and the fixed amount to suitably proportion a circle being produced.

19. A system as in claim 18 wherein said second means further comprises calculating means for producing a series of values approximating a circle as a function of rectilinear index positions: said first means further includes frequency control means connected to said calculating means for controlling the rate of occurrence of said rectilinear index positions; said third means further includes multiplication means connected to the output of said calculating means for multiplying said values by a predetermined amount; and said fourth means further comprises radius control means connected to said frequency control means and said multiplication means for coordinating said rate of occurrence and said predetermined amount of multiplication to obtain a circular shape.

20. In a system for measuring individually the zones of inhibition surrounding a plurality of antibiotic reservoirs located in a spaced arrangement in an innoculated medium, the method comprising:
   a. scanning the medium and electronically producing a first digitized picture of the reservoirs within the medium;
   b. generating a search window whose size is larger than each of said reservoirs;
   c. superimposing said search window on to said first digitized picture in sequential positions, such that a different one of said reservoirs is located within said shape for each position;
   d. finding the center of the reservoir for each position within the search window generated;
   e. again scanning the medium and electronically producing a second digitized picture of the zones within the medium;
   f. generating a plurality of concentric circles of predetermined incremental value about each of said center locations found;
   g. comparing a zone from the second digitized picture with each of the circles produced for that zone center;
   h. determining the points of intersection between each of the circles and the perimeter of the digitized zones for the zone involved;
   i. selecting for each zone the particular circle producing a predetermined number of points of intersection; and
   j. displaying the selected circle and its dimensions.

* * * * *